Figure 1:
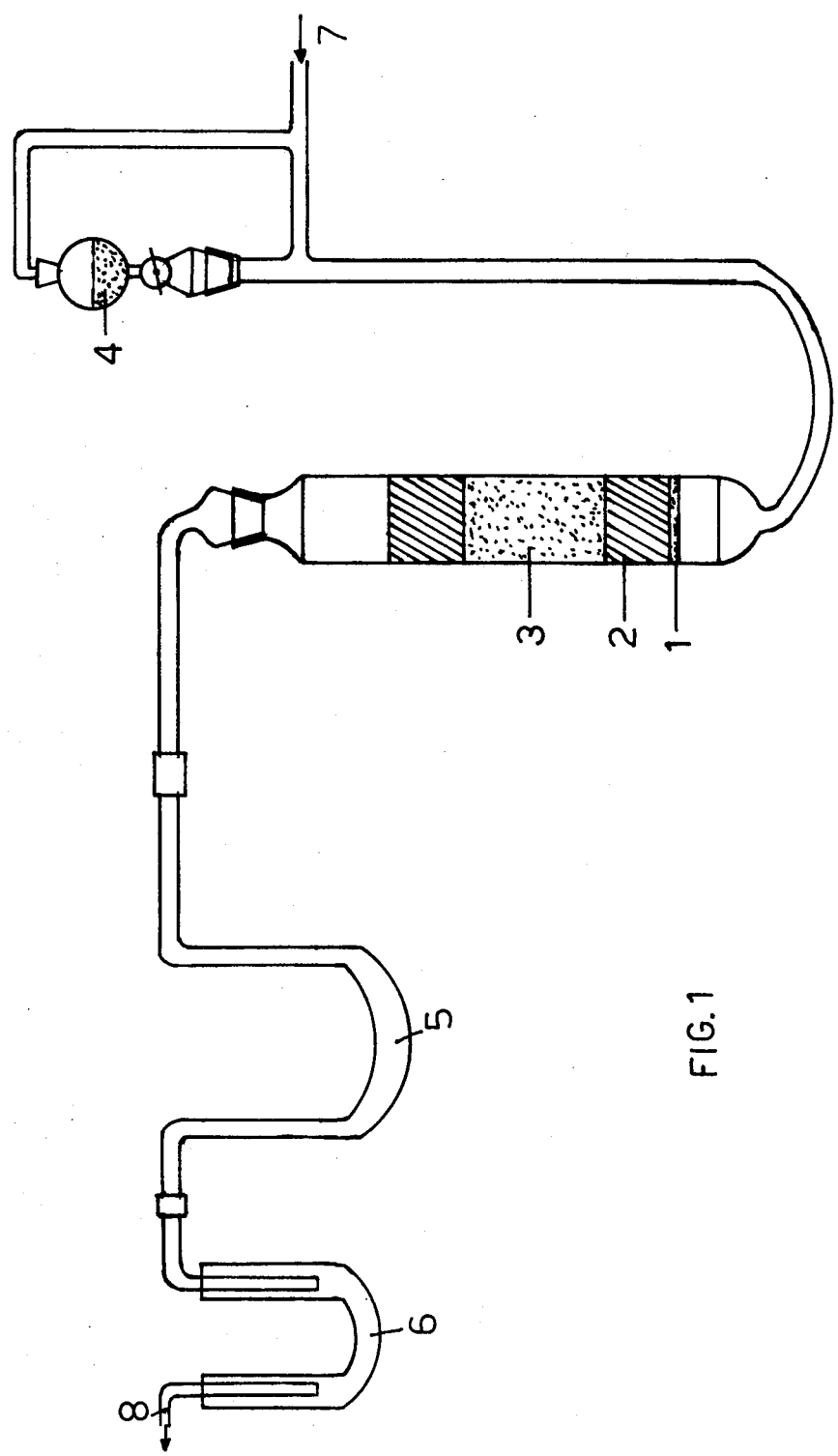

United States Patent [19]

Cesca et al.

[11] 4,239,873

[45] Dec. 16, 1980

[54] PROCESS FOR THE POLYMERIZATION OF ALPHA-OLEFINS, CATALYST EMPLOYED IN SAID PROCESS AND METHOD FOR THE PREPARATION THEREOF

[75] Inventors: Sebastiano Cesca, San Donato Milanese; Alberto Greco, Dresano; Guglielmo Bertolini, Pavia; Mario Bruzzone, San Donato Milanese, all of Italy

[73] Assignee: Snamprogetti, San Donato Milanese, Italy

[21] Appl. No.: 863,695

[22] Filed: Dec. 23, 1977

Related U.S. Application Data

[63] Continuation of Ser. No. 568,169, Apr. 15, 1975, abandoned.

[30] Foreign Application Priority Data

Apr. 17, 1974 [IT] Italy .............................. 21517 A/74

[51] Int. Cl.$^3$ .......................... C08F 4/02; C08F 10/02
[52] U.S. Cl. .............................. 526/114; 252/429 C; 526/97; 526/115; 526/116; 526/352
[58] Field of Search ................. 526/97, 114, 115, 116

[56] References Cited

U.S. PATENT DOCUMENTS

| 3,223,651 | 12/1965 | Tornquist et al. | 526/116 |
| 3,256,257 | 6/1966 | Argabright et al. | 526/114 |
| 3,658,722 | 4/1972 | Delbouille et al. | 526/124 |
| 3,772,261 | 11/1973 | Faltings et al. | 526/159 |
| 3,812,089 | 5/1974 | Tashiro et al. | 526/115 |

FOREIGN PATENT DOCUMENTS

| 933753 | 10/1955 | Fed. Rep. of Germany . |
| 2137872 | 2/1972 | Fed. Rep. of Germany . |
| 884249 | 12/1961 | United Kingdom . |
| 921955 | 3/1963 | United Kingdom . |
| 1314784 | 4/1973 | United Kingdom . |

*Primary Examiner*—Edward J. Smith
*Attorney, Agent, or Firm*—Morgan, Finnegan, Pine, Foley & Lee

[57] ABSTRACT

An alpha-olefin such as ethylene is polymerized in the presence of a catalyst system consisting of (1) an alkylhalide, alkyl-derivative or hydride of a metal belonging to one of the first three groups of the periodic system and (2) the combination product of a transition metal chloride and titanium trichloride, supported on a previously chlorinated material such as chlorinated γ-alumina having a high superficial area.

6 Claims, 1 Drawing Figure

PROCESS FOR THE POLYMERIZATION OF ALPHA-OLEFINS, CATALYST EMPLOYED IN SAID PROCESS AND METHOD FOR THE PREPARATION THEREOF

This is a continuation, of application Ser. No. 568,169 filed Apr. 15, 1975, now abandoned.

The present invention relates to (a) a process for the polymerization of alpha-olefins, particularly ethylene, by means of a catalyst system constituted by an alkyl-derivative or hydride of a metal belonging to one of the first three groups of the periodic system and by the combination of a transition metal halide and titanium trichloride finely dispersed on a high superficial area material; (b) to the catalyst employed in that process and (c) to the preparation thereof.

It is known that titanium halides, active from a catalytic point of view, are generally employed in the low-pressure polymerization of alpha-olefins. They are prepared by reducing titanium tetrachlorides with aluminum alkyls or alkyl-halides. The reaction is generally carried out in an inert atmosphere and in the presence of an inert solvent. The catalyst obtained thereby is then used together with metal alkyls for the polymerization of alpha-olefins in the suspension of an organic solvent under low monomer pressures. However these titanium halides are impure because of aluminum compounds and do not show a very high catalytic activity so that the final polymer needs expensive washing operations in order to remove the catalyst residues.

Recently methods have been proposed according to which titanium halides are carried on inorganic substances so as to obtain polymerization catalyst having an improved efficiency.

For instance use has been made of carriers constituted by magnesium oxide or hydroxychloride, or high superficial area silica or alumina; however it is to be noted that the catalytic activity of the titanium compounds on the aforesaid materials as catalyst carriers depends largely on the chemical nature of the surface thereof so that such carriers must be subjected to treatments with Grignard derivatives, aluminum alkyls or hydrogen in order to improve their efficiency.

According to our copending patent application Ser. No. 568,170, filed Apr. 15, 1975 now abandoned; such drawbacks may be overcome by using, together with an aluminum compound, a product derived from the combination of a transition metal chloride with titanium trichloride. Such a combination (or association) being finely dispersed on a material of high superficial area, generally selected from the oxides of the elements belonging to the 2nd to the 4th groups of the periodic system or from the rare earth group.

Such combinations were prepared by impregnating the carrier, previously dehydrogenated, with a compound of the transition metal in the lowest valence state, preferably in the zero valence state, such as metal carbonyl compounds and, then by refluxing said carrier in titanium tetrachloride and, finally, by removing the excess thereof.

During the process volatile substances were developed, e.g. carbon monoxide, where use was made of a metal which was oxidized during reduction of titanium tetrachloride to trichloride.

However a certain amount of trivalent titanium could remain to be fixed because of hydrolytic reactions between $TiCl_4$ and the hydroxyls of the carrier, and this lowers the catalytic activity.

It has now been found that it is possible to eliminate this possible drawback also by previously chlorinating those carriers containing superficial hydroxyl groups.

The present invention relates in particular to a process for the polymerization of alpha-olefins by means of a catalyst system constituted by an alkyl-halide, alkyl-derivative or hydride of a metal belonging to one of the first three groups of the periodic system and by the combination of a transition metal chloride and titanium trichloride, finely dispersed on a previously chlorinated material of high superficial area.

The material, employed as carrier, is selected from the oxides of the elements from the 2nd to the 4th group of the periodic system, preferably from silica, alumina, silica-alumina, $ZrO_2$, $MgO$, $TiO_2$, $CaO$. It is previously chlorinated through a treatment in the temperature range of from 100° to 400° C. with a chlorinating agent, under an inert atmosphere, after a previous drying in the same reaction vessel at a temperature equal to or higher than the chlorinating temperature. Chlorinating agents which can be advantageously employed in the aforesaid treatment are chlorinated compounds of B, C, N, Al, Si, P, S, such as $CCl_4$, $CHCl_3$, $COCl_2$, $SiCl_4$, $(CH_3)_2SiCl_2$, $BCl_3$, $SOCl_2$, $POCl_3$, etc., or also HCl and $Cl_2$.

The chlorination treatment is quite general. The material which we are interested in, after a preliminary drying at about 400° C., is ventilated, under a nitrogen stream, by vapors of the chlorinating agent over a period ranging from two to four hours.

The apparatus employable in the laboratory chlorinating process is illustrated schematically in the drawing.

In FIG. 1:
1 is a porous septum built up of sintered glass
2 is glasswool
3 is the material to be chlorinated
4 is the chlorinating agent
5 is a trap
6 is a bubbler
7 is the nitrogen inlet
8 is the output of gas and nitrogen Generally 50 ml of chlorinating agent are enough for 20–40 mg of material to be chlorinated.

To the so obtained chlorinated material, suspended in $TiCl_4$, there is added the compound of the transition metal in the lowest valence state and it is then subjected to a $TiCl_4$ reflux.

Alternatively the chlorinated carrier may be impregnated with the transition metal compound and then refluxed in titanium tetrachloride.

The compound of the transition metal, generally a zero valence one, may contain ligands other than the carbonyl one, for instance allyl, olefin, diene or polyene, carbene groups, etc.

The reaction gives rise to the transition metal chloride and titanium trichloride. The transition metal is generally selected from V, Mn, Fe, Co and the amount used is in the range of from 0.1 to 10% with respect to the carrier weight.

The co-catalyst obtained thereby has variable amounts of titanium. The concentration thereof may be regulated by controlling the amount of the transition metal.

Generally the amount of titanium ranges from 0.1 to 10% by weight with respect to the carrier weight.

These catalysts exhibit good behaviour in the presence of hydrogen and, when ethylene is polymerized, a narrow molecular weight range thereof is produced.

The polymerization reaction is carried out according to known procedures at temperatures of from 0° to 200° C. and at pressures of from 0.1 to 50 atmospheres.

The polymerizations are carried out in a steel autoclave equipped with an anchor stirrer if the pressure is higher than the atmospheric one. The catalyst is fed together with solvent and metal alkyl. The autoclave being thermostated at the polymerization temperature, hydrogen is sent under pressure and then also the monomer at the desired pressure ratio. The reaction is stopped by adding alcohol to the autoclave. With particular reference to the examples hereinafter reported, the solvent, the metallorganic compound [Al(i-$C_4H_9$)$_3$] present in a concentration of 0.2% (vol.) and the association of the transition element compounds, previously prepared as aforesaid, are introduced into the autoclave thermostated at 85° C. The ethylene pressure is kept constant during the whole test which is carried out over variable times, as the examples show.

These operating conditions are described in the following examples under the expression "standard polymerization".

The obtained polymers are dried under vacuum to a constant weight before the evaluation of the yields as polymer.

However the examples, hereinafter reported, are only for the purpose of illustrating the present invention which is not to be construed as limited thereby.

EXAMPLE 1

24 g of chlorinated $SiO_2/Al_2O_3$ (87:13) (chlorine amount equal to 10.5%) were treated with 0.3 g of $Mn_2$ (CO)$_{10}$ in hexane. Hexane was eliminated at the rotating evaporator, and the material was refluxed in 100 ml of TiCl$_4$ for 4 hours.

Hot filtered, repeatedly washed with hexane and dried under vacuum, the product showed, upon analysis, the following composition:

| Ti | = | 2.13% |
|---|---|---|
| Mn | = | 0.89% |
| Cl | = | 15.16% |

190 mg of the product obtained thereby were employed in a standard polymerization test of ethylene at partial pressures of hydrogen and ethylene equal to 10/10 atmospheres. After two hours we obtained 118 g of polymer having $MF_{2.16}=0.36$, $MF_{21.6}=17$, $MF_{21.6}/MF_{2.16}=47$ and containing 34.3 ppm of Ti and 49.0 ppm of Mn+Ti.

EXAMPLE 2

20 g of chlorinated γ-alumina (chlorine amount equal to 7.04%), obtained from a γ-$Al_2O_3$ having a superficial area equal to 230 m$^2$/g, were suspended in TiCl$_4$ (50 ml) together with 0.59 g of $Mn_2$ (CO)$_{10}$. TiCl$_4$ was refluxed under nitrogen for 6 hours, thereafter the solid was filtered, repeatedly washed with hexane and dried under vacuum. It had the following composition

| Ti | = | 1.30% |
|---|---|---|
| Mn | = | 0.77% |
| Cl | = | 10.39% |

102 mg of this material were employed in a standard polymerization of ethylene at relative pressures of ethylene and hydrogen equal to 10/10 atmospheres. After two hours, we obtained 38 g of polyethylene having $MF_{2.16}=0.4$, $MF_{21.6}=19.0$, $MF_{21.6}/MF_{2.16}=48$ and containing 34.5 ppm as Ti and 55 ppm of Mn+Ti.

EXAMPLES 3–5

25 g of chlorinated $SiO_2$ (10.2% chlorine), obtained from 600 m/g $SiO_2$, were refluxed in TiCl$_4$ (70 ml) together with $Mn_2$ (CO)$_{10}$ (g 1.450) for 26 hours. A product was filtered, washed and dried under vacuum having the following composition

| Ti | = | 6.33% |
|---|---|---|
| Mn | = | 1.20% |
| Cl | = | 16.33% |

By using this product, the following polymerization tests were carried out for two hours.

| Ex. | Cat mg | $P_{H2}/P_{C2H4}$ | $MF_{2.16}$ | $MF_{21.6}$ | $MF_{21.6}/MF_{2.16}$ | g polymer | ppm Ti | ppm Mn + Ti |
|---|---|---|---|---|---|---|---|---|
| 3 | 171 | 10/10 | 0.303 | 12.66 | 40 | 172 | 63.3 | 75.3 |
| 4 | 290 | 10/5 | 0.704 | 27.89 | 39.6 | 138 | 137 | 152 |
| 5 | 300 | 15/5 | 1.9 | 74.86 | 39 | 170 | 112 | 133 |

EXAMPLES 6–9

γ-$Al_2O_3$ (230 m/g) was chlorinated in the described reactor. The chlorine amount was 7.28% 5.5 g of this chlorinated alumina were suspended in 50 ml of TiCl$_4$ together with 1.1 g of $Mn_2$(CO)$_{10}$ and the whole was refluxed for 6 hours.

After being washed with hydrocarbons and dried under vacuum, the material had the following composition

| Ti | = | 7.03% |
|---|---|---|
| Mn | = | 3.77% |
| Cl | = | 23.64% |

By employing this product, the following tests were carried out at polymerization tests of two hours.

| Ex. | Cat. mg. | $P_{H2}/P_{C2H4}$ | $MF_{2.16}$ | $MF_{21.6}$ | $MF_{21.6}/MF_{2.16}$ | g polymer | ppm Ti | ppm Mn + Ti |
|---|---|---|---|---|---|---|---|---|
| 6 | 135 | 5/10 | 0.055 | 3.496 | 63.56 | 203 | 46.5 | 72 |
| 7 | 220 | 10/10 | 0.935 | 42.064 | 44.99 | 255 | 60.5 | 93 |
| 8 | 239 | 10/5 | 4.064 | 168.49 | 41.41 | 90 | 186 | 288 |

-continued

| Ex. | Cat. mg. | $P_{H2}/P_{C2H4}$ | $MF_{2.16}$ | $MF_{21.6}$ | $MF_{21.6}/MF_{2.16}$ | g polymer | ppm Ti | ppm Mn + Ti |
|---|---|---|---|---|---|---|---|---|
| 9 | 242 | 15/5 | 18.22 | 679.37 | 37.3 | 68 | 249 | 385 |

What we claim is:

1. A process for the polymerization of an alpha-olefin, wherein the reaction is carried out in the presence of a two-component catalyst system consisting of: (a) a member of the group consisting of the alkyl-halides, alkyl-derivatives and hydrides of the metals belonging to the first three groups of the Periodic System, and (b) the combination product of titanium trichloride and a chloride of another transition metal, derived from the reaction of $TiCl_4$ and a carbonyl compound of said other transition metal, finely dispersed and carried on a material of high superficial area selected from the group consisting of the chlorinated oxides of the elements belonging to the 2nd to the 4th groups of the Periodic System.

2. Process for the polymerization of an alpha-olefin as claimed in claim 1, wherein the transition metal is present in an amount in the range of from 0.1 to 10% by weight with respect to the carrier weight.

3. Process for the polymerization of an alpha-olefin as claimed in claim 1, wherein the transition metal is a member of the group consisting of V, Mn, Co and Fe.

4. Process for the polymerization of an alpha-olefin as claimed in claim 1, wherein the employed olefin is ethylene.

5. Porcess for the polymerization of an alpha-olefin as claimed in claim 1, wherein the reaction is carried out in the presence of a hydrocarbon solvent.

6. Process for the polymerization of an alpha-olefin as claimed in claim 1, wherein the reaction is carried out in the temperature range of from 0° to 200° C. and in the pressure range of from 0.1 to 50 atmospheres.

* * * * *